Feb. 14, 1933.    R. M. PALMER ET AL    1,897,529
FISHING LURE
Filed June 18, 1931
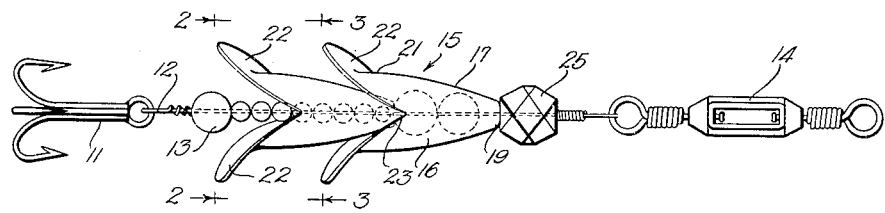
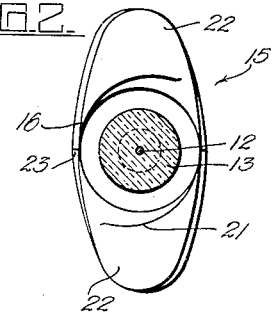   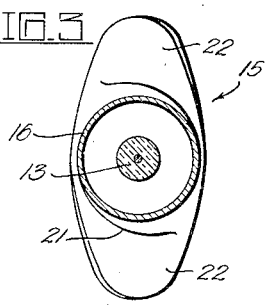
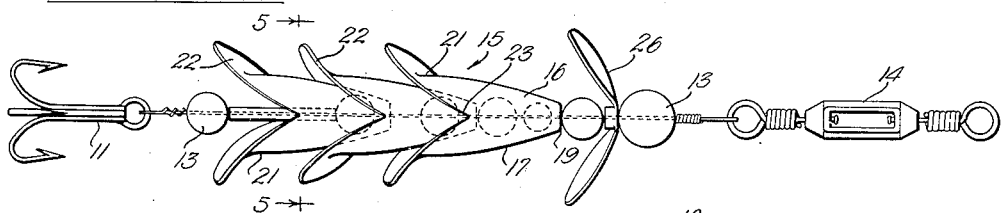
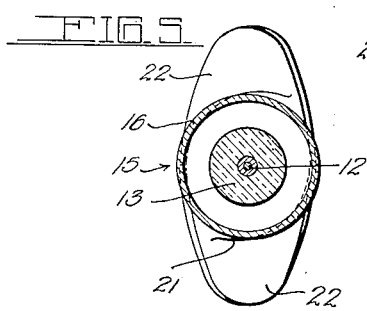   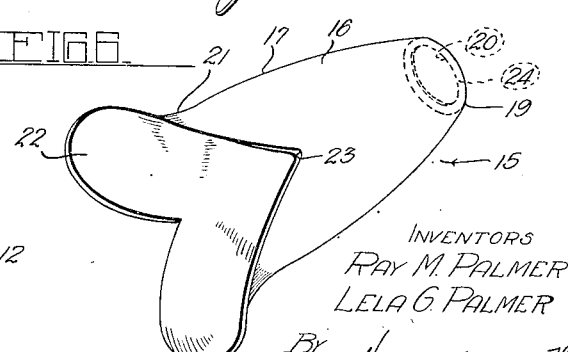
INVENTORS
RAY M. PALMER
LELA G. PALMER
By Hazard and Miller
ATTORNEYS.

Patented Feb. 14, 1933

1,897,529

UNITED STATES PATENT OFFICE

RAY M. PALMER AND LELA G. PALMER, OF PASADENA, CALIFORNIA

FISHING LURE

Application filed June 18, 1931. Serial No. 545,230.

Our invention relates to a fishing lure of a spinning type adapted for attachment to the leader on which the fish hook is attached.

An object of our invention is the formation of a spinner or spinners which may be nested together, that is, in which one spinner overlaps the other and each spinner rotates independently of the adjacent spinner, and, if desired, these rotate in opposite directions in accordance with the style of the pitch of the blade ends of the spinner.

Another object and feature is the construction of a spinner in which the body portion is somewhat cone shaped, the apex of which engages a bead or the like on the leader, such bead taking the thrust of the spinner. The spinner is open at the end toward the hook and has a flared skirt with outwardly extending blades, these blades being inclined or having a pitch to cause the spinner to rotate when pulled through the water or when used in the flowing current.

Our invention is illustrated in the accompanying drawing, in which:

Fig. 1 is a side elevation of one mounting of our construction showing two spinners nested together;

Fig. 2 is a section on the line 2—2 of Fig. 1 in the direction of the arrows;

Fig. 3 is a section on the line 3—3 of Fig. 1 in the direction of the arrows;

Fig. 4 is a side elevation of another mounting for our spinners;

Fig. 5 is a section on the line 5—5 of Fig. 4 in the direction of the arrows;

Fig. 6 is an enlarged perspective view of one of the spinners.

In the drawing, a fish hook 11 has a leader or lead line 12 connected thereto and on this line there are a series of beads 13. The leader is provided with the usual swivel 14.

Individual spinner 15 has a somewhat conical shaped body 16, this being slightly convex as indicated at 17 considered longitudinally. It is provided at its small end with a contracted end 19 which has a perforation 20 therethrough, the contracted end being for the purpose of engaging a bead, the bead forming the thrust bearing for the spinner. The lower end of the spinner has a flared skirt 21, from which skirt there extend a pair of blades 22. The body of the spinner has a V-shaped notch 23 in the sides, each individual blade extending to the upper end of the notch. Each blade is slightly warped and the blades are given a twist or a pitch so that the spinner will rotate in the water.

At the contracted end 19, this is slightly necked in as indicated at 24 (note Fig. 6). This necked in end may act as a thrust bearing on one of the beads 13 which is threaded on the leader. It will be noted by my construction that these spinners may be nested together and, for instance as shown in Fig. 1, both have their blades flared to rotate in the same direction, whereas in Fig. 4 three spinners are shown, the center one having the blades flared in the opposite direction to the end spinners, thus giving the center one a different direction of rotation from those of the ends.

The spinners may be brightly colored in order to simulate flies or the like and, if desired, at the small end of the first spinner, we may employ a large cut glass bead 25 or, as illustrated in Fig. 4, we may employ a propeller blade type of spinner 26.

It will be noted that our fishing lure is formed by a plurality of hollow spinners interfitting one in the other. These are made somewhat conical-shaped, and the reduced end of one spinner is enclosed well in the body structure of the next adjacent spinner. As the lead wire 12 extends through these various spinners the wires with the spinners thereon may flex slightly. The blades of the spinners may be arranged to rotate them all in the same direction or in opposite directions, and this flexing movement together with the movement of the individual spinners simulates the flexing of the body of a minnow or small fish, and the spinning of the blades simulates the flashing of the fins of such minnows or small fish. Thus, our fishing lure is designed to have a flexible type of body structure formed by the individual spinners nested together, and with these having their independent rotation.

Various changes may be made in the features of the invention without departing from the spirit or scope thereof as defined by the appended claim.

We claim:

In a fishing lure, a hollow spinner having the shape of a frustum of a cone with a slight convexity on its outer surface, the apex end of the frustum having a perforation, the spinner having a pair of diametrically opposed V-shaped notches at the lower end or base portion of the frustum with skirt portions flared outwardly in opposite directions to form flared blades, said blades being sloped symmetrically as to the axis of the spinner and being warped to form a pitch to rotate the spinner when drawn through the water.

In testimony whereof we have signed our names to this specification.

LELA G. PALMER.
RAY M. PALMER.